United States Patent
McFarlane

(10) Patent No.: US 11,539,870 B2
(45) Date of Patent: Dec. 27, 2022

(54) FIRE ARM MONITORING SYSTEM

(71) Applicant: Etheric McFarlane, Portland, OR (US)

(72) Inventor: Etheric McFarlane, Portland, OR (US)

( * ) Notice: Subject to any disclaimer, the term of this patent is extended or adjusted under 35 U.S.C. 154(b) by 117 days.

(21) Appl. No.: 17/062,219

(22) Filed: Oct. 2, 2020

(65) Prior Publication Data

US 2021/0136277 A1    May 6, 2021

Related U.S. Application Data

(60) Provisional application No. 62/930,591, filed on Nov. 5, 2019.

(51) Int. Cl.
| | |
|---|---|
| *H04N 5/232* | (2006.01) |
| *H04N 5/225* | (2006.01) |
| *H04N 7/18* | (2006.01) |
| *G06Q 50/26* | (2012.01) |
| *F41C 27/00* | (2006.01) |

(52) U.S. Cl.
CPC ......... *H04N 5/23206* (2013.01); *F41C 27/00* (2013.01); *G06Q 50/26* (2013.01); *H04N 5/2252* (2013.01); *H04N 5/23218* (2018.08); *H04N 7/183* (2013.01)

(58) Field of Classification Search
CPC ..... H04N 2201/0055; H04N 2201/006; H04N 1/00103–00108; H04N 1/00315; H04N 5/3454; H04N 7/183; H04N 5/2252; H04N 5/23218; H04N 5/23206; G06F 1/1698; G06F 2213/3814; G06F 9/50; G06F 1/163; F41A 35/00; F41A 17/063; F41C 27/00; G06Q 50/26
USPC ...................... 396/56–59; 361/679.03, 56–59
See application file for complete search history.

(56) References Cited

U.S. PATENT DOCUMENTS

| | | | |
|---|---|---|---|
| 2009/0189981 A1* | 7/2009 | Siann ................. | H04N 21/6373 348/143 |
| 2015/0176937 A1* | 6/2015 | Sullivan .................. | F41G 1/00 42/84 |
| 2016/0190859 A1* | 6/2016 | Blum ........................ | F41J 5/10 348/372 |
| 2017/0059265 A1* | 3/2017 | Winter .................... | H04N 5/913 |
| 2017/0366753 A1* | 12/2017 | Liu ........................ | H04L 43/10 |

* cited by examiner

*Primary Examiner* — Xi Wang

(57) ABSTRACT

A system and method for acquiring video content using a gun camera secured to a weapon is provided. One embodiment comprises a processor system; a camera communicatively coupled to the processor system; a wireless transceiver communicatively coupled to the processor system; and at least one sensor configured to detect an interior surface of the holster, wherein the sensor communicates a signal to the processor that indicates that the gun camera and the weapon are not secured within the holster in response to no longer detecting the interior surface of the holster, and wherein the processor system activates the camera to acquire video content in response to receiving the signal from the at least one detector that indicates that the weapon has been drawn from the holster.

19 Claims, 5 Drawing Sheets

FIRE ARM MONITORING SYSTEM

PRIORITY CLAIM

This application claims priority to U.S. Application Ser. No. 62/930,591, filed on Dec. 13, 2019, which is hereby incorporated by reference for all purposes

BACKGROUND OF THE INVENTION

Law enforcement officers working in the field are monitored using a variety of legacy monitoring systems. Such monitoring systems memorialize the action of a law enforcement officer who works in the field. Similar video and/or audio content acquisition systems may be used by military personnel.

An example legacy law enforcement officer monitoring system is commonly referred to as a body camera. The body camera includes a video image capture device (video camera), a microphone, and memory for storing acquired video and audio content (data). Typically, the body camera is secured to a protective bulletproof vest or body armor being worn by the law enforcement officer. Here, as the law enforcement officer is interacting with people or participating in various field operations, the body camera acquires and stores video and/or audio information to memorialize the activity of the law enforcement officer.

Another example legacy monitoring system is commonly referred to as a police in-car camera system. The in-car camera system also includes a video image capture device (video camera), an optional microphone, and memory for storing acquired video and audio content. Typically, the in-car camera system is secured to a dashboard or other suitable location on the law enforcement officer's vehicle. Here, as the law enforcement officer is interacting with people or participating in various field operations, the in-car camera system acquires and stores video and audio information to memorialize the activity occurring in proximity to the vehicle.

However, such legacy camera-based monitoring systems have a variety of deficiencies. Often, the body camera systems are operated by the law enforcement officer. For example, the law enforcement officer may turn on their body camera when they begin a particular field operation. However, in some instances, the law enforcement officer may inadvertently forget to activate their camera-based monitoring system. In other situations, the law enforcement officer may inadvertently, or intentionally, turn off their body camera. Accordingly, the body camera may not be operating during a critical incident. Therefore, the critical incident may not be memorialized by the video and/or audio information acquired by the body camera. The same problem may occur with in-car camera systems.

Another example deficiency in an in-car camera system is that if the field activity does not occur within the fixed field of view of the in-car camera system, the acquired video content will not include discernable video images of the activity (even though audio content with sounds pertaining to the activity may be acquired by the in-car camera system). Accordingly, the in-car camera system has a limited range of usefulness.

Further, when in operation, the legacy body cameras and in-car camera systems may likely be acquiring video and/or audio content during times of activity that is of no importance. That is, large amounts of acquired video and/or audio content must be stored. In the event that a critical incident that must be reviewed, potentially large amounts of video and/or audio content must be manually examined to locate and review the critical incident. Here, the acquired video and/or audio content that memorializes activity that is of no interest may inefficiently utilize storage capacity, and may waste valuable time of personnel examining the acquired video and/or audio content when searching for information on a particular critical incident.

Additionally, there is a lack of tools for a private citizen to acquire video and/or audio content for the use of their personal weapons. For example, recording video and/or audio content during a crime situation, such as when the weapon owner is at home, may be highly desirable. As another example, a weapon owner may be at a firing range practicing and/or participating in a shooting competition. In such situations, it may be desirable to acquire video and/or audio content during use of the weapon.

Accordingly, in the arts of weapon use monitoring systems, there is a need in the arts for improved methods, apparatus, and systems for monitoring and memorializing weapons use, such as encountered during field activities of a law enforcement officer.

SUMMARY OF THE INVENTION

Embodiments of a weapon use monitoring system provide a system and method for acquiring video content using a gun camera secured to a weapon. One embodiment comprises a processor system; a camera communicatively coupled to the processor system; a wireless transceiver communicatively coupled to the processor system; and at least one sensor configured to detect an interior surface of the holster, wherein the sensor communicates a signal to the processor that indicates that the gun camera and the weapon are not secured within the holster in response to no longer detecting the interior surface of the holster, and wherein the processor system activates the camera to acquire video content in response to receiving the signal from the at least one detector that indicates that the weapon has been drawn from the holster

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
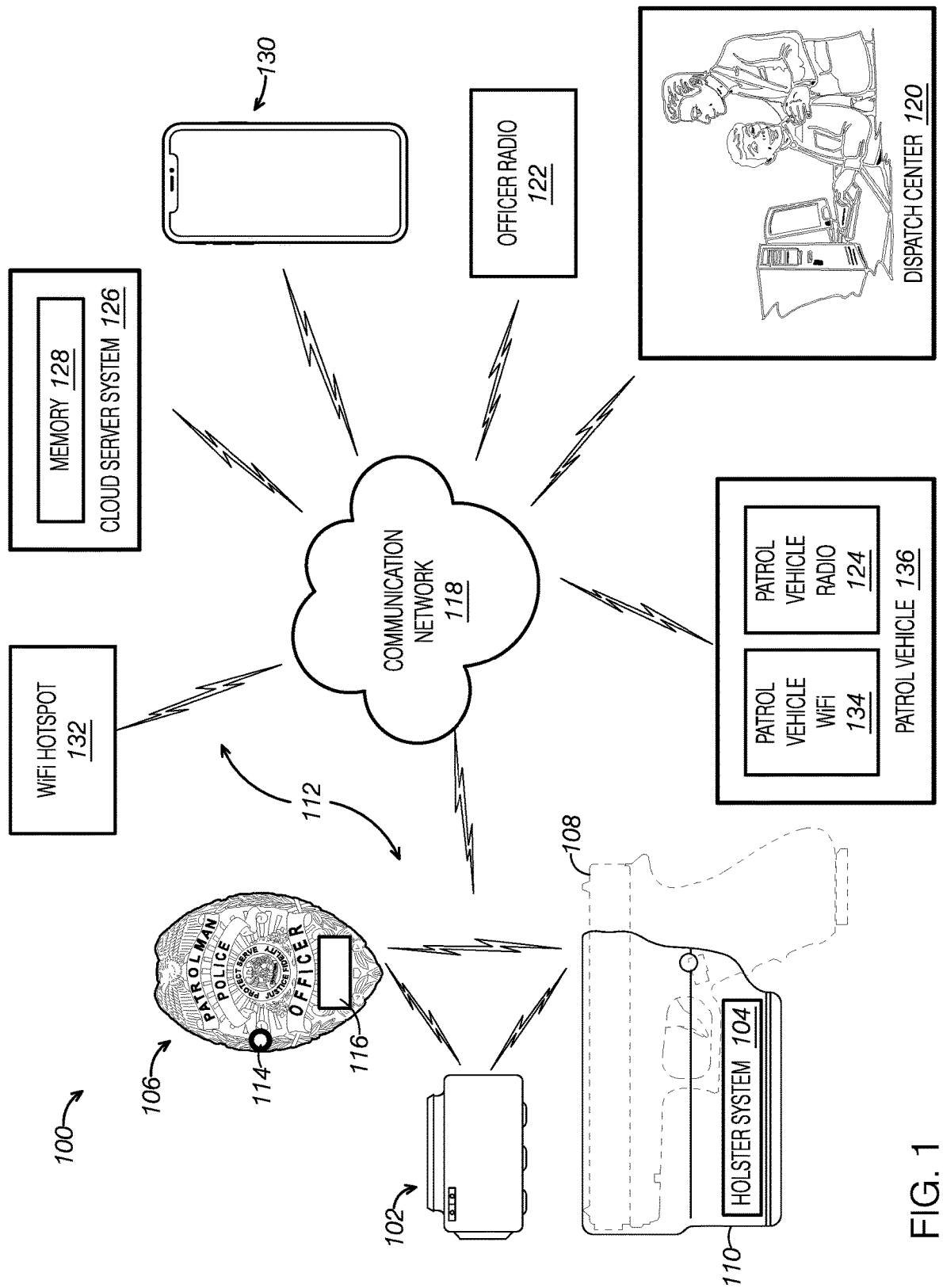
FIG. 1 is a block diagram of a weapon use monitoring system.

FIG. 1 is a block diagram of a weapon use monitoring system 100. Embodiments of the weapon use monitoring system 100 provide for an improved method and system for monitoring activities of a law enforcement officer who is operating out in the field. The weapon use monitoring system 100 may also be used by private citizens and/or military personnel to memorialize use of their weapon. Within this disclosure, use of the weapon use monitoring system 100 is conceptually described for use by a law enforcement officer who is working in a field environment. One skilled in the art appreciates that use of the weapon use monitoring system 100 by a private citizen and/or by military personnel is equally applicable.

More particularly, the weapon use monitoring system 100 may be actuated to acquire video and optional audio content in a variety of manners. In a law enforcement environment, the weapon use monitoring system 100 may be actuated by either the law enforcement officer or a remote dispatcher. In a military environment, the weapon use monitoring system 100 may be activated when the military personnel embark on a specific mission. In the situation of a private citizen, the citizen may actuate their weapon use monitoring system 100 at times of interest, and/or may leave the weapon use monitoring system 100 activated at all times.

In all instances, the weapon use monitoring system 100 is actuated to acquire video and/or audio content in response to the weapon user drawing their handgun from its holster. Accordingly, whenever the weapon user's weapon is drawn and is not secured within its holster, the weapon use monitoring system 100 is acquiring video and audio content. In a law enforcement environment, during such situations, the operation of the weapon use monitoring system 100 cannot be turned off or otherwise inadvertently disabled so as to fail acquiring the video and/or audio content while the law enforcement officer's weapon is drawn.

In the various embodiments, the weapon use monitoring system 100 is activated while the weapon user is wearing their weapon in their holster, such as when the law enforcement officer is in the field during active duty. While on duty, the weapon use monitoring system 100 cannot be deactivated. When the law enforcement officer is off duty and/or is not working in the field, the weapon use monitoring system 100 can be deactivated. Preferably, activation and deactivation is remotely controlled by personnel in an officer dispatch center and/or at the law enforcement officer's station. An unexpected advantage of such embodiments is that the law enforcement officer cannot inadvertently, or intentionally, deactivate the weapon use monitoring system 100 while on duty in the field.

The disclosed systems and methods for a weapon use monitoring system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for a weapon use monitoring system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device is communicatively connected to another electronic device, either wirelessly or with a wire based connector, whether directly or indirectly through a communication network. "Controllably coupled" means that the electronic device is controls operation of the other electronic device.

Returning to FIG. 1, embodiments of the weapon use monitoring system 100 comprise a gun camera 102, an optional holster system 104, and an optional monitoring badge 106. The gun camera 102 is configured to securely couple to a weapon 108, such as a law enforcement officer's weapon 108. Preferably, the gun camera 102 cannot be decoupled from the weapon 108 while the law enforcement officer is working in the field. A holster 110 is configured to receive and secure the weapon 108 with the gun camera 102 when the weapon 108 is not in use. Embodiments of the weapon use monitoring system 100 may be equally applied to other devices, such as a taser device or the like.

When the weapon user draws their weapon 108 from the holster 110, the gun camera 102 is automatically actuated (activated) so as to begin acquiring video and/or audio content (interchangeably referred to herein as data or information). When the weapon 108 is returned to the holster 110, the gun camera 102 is optionally deactivated and no longer acquires the video and/or audio content.

In some embodiments, the gun camera 102 discontinues the acquisition of the video and/or audio content after some predefined duration. For example, after the weapon 108 is holstered, and if the predefined duration is five minutes, then if the law enforcement officer again draws their weapon 108, the video and/or audio content is still being acquired. Then, if the law enforcement officer draws the weapon 108 before expiration of the predefined duration, a continuous time sequenced stream of video and/or audio content will have been acquired that includes the time that the weapon 108 was holstered and then drawn from the holster 110.

In some embodiments, particularly in a law enforcement environment, the monitoring badge 106 includes an optional video capture device (camera) 114 and an optional display 116. Depending upon the preferred practice, the camera 114 of the monitoring badge 106 may be continuously operating while the law enforcement officer is deployed in the field. Accordingly, the camera 114 of the monitoring badge 106 may replace the legacy body camera.

In some embodiments, the camera 114 of the monitoring badge 106 initiates capture of video and/or audio information when the weapon 108 is drawn from the holster 110. Here, the gun camera 102 communicates an actuation signal to the monitoring badge 106 to initiate acquisition of at least video content by the camera 114 of the monitoring badge 106.

In a preferred embodiment, the gun camera 102, the holster system 104, and the monitoring badge 106 are directly communicatively coupled to each other via wireless communication signals 112. In such embodiments, the wireless communication system is a low power communication system, such as a near-field communication system. An example near-field communication is Bluetooth. Any suitable low power and/or near-field communication system now known or later developed may be used in the various embodiments. A low power near-field communication system is suitable because of the close proximity of the gun camera 102, the holster system 104, and the monitoring badge 106 to each other when in use by the law enforcement officer.

Additionally, or alternatively, the gun camera 102, the holster system 104, and/or the monitoring badge 106 may be communicatively coupled to other remotely located electronic devices. The gun camera 102, the holster system 104, and/or the monitoring badge 106 may be directly and/or indirectly communicatively coupled to such electronic devices via a communication network 118. The communication network 118 is illustrated as a generic communication system. In one embodiment, the communication network 118 comprises a cellular telephone system, such as a radio frequency (RF) wireless system. Accordingly, the gun camera 102, the holster system 104, and/or the monitoring badge 106 include a suitable transceiver. Alternatively, the communication network 118 may be a telephony system, the Internet, a Wi-fi system, Bluetooth, a near-field communication system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the gun camera 102, the holster system 104, and/or the monitoring badge 106 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM), and 4G/5G wireless networks. Also, embodiments of the gun camera 102, the holster system 104, and/or the monitoring badge 106 may be configured to communicate over combination systems having a plurality of segments which employ different formats for each segment that employ different technologies on each segment.

In a law enforcement environment, one or more of the components of the weapon use monitoring system 100 (the gun camera 102, the holster system 104, and/or the monitoring badge 106) may be communicatively coupled to an officer dispatch center 120, command center, or the like. When the law enforcement officer draws their weapon 108 from the holster 110, such that the gun camera 102 (and/or the camera 114 of the monitoring badge 106) begins acquiring video and/or audio content, a notification signal may be communicated to the dispatch center 120 to notify dispatch personnel that the law enforcement officer has drawn their weapon 108 from the holster 110.

Additionally, the stream of video and/or audio content acquired by the gun camera 102 and/or the camera 114 of the monitoring badge 106 may be communicated to the dispatch center 120 in real time, or near real time. Accordingly, dispatch personnel, in real time or near real time, may view the video content and/or hear the audio content acquired by the gun camera 102 and/or the monitoring badge 106 to ascertain the nature of the situation that the law enforcement officer has encountered.

The dispatch personnel may initiate communications with the law enforcement officer by communicating with the officer radio 122 and/or the patrol vehicle radio 124 being used by that particular law enforcement officer. Here, advice communicated from the dispatch center 120 may be used to facilitate de-escalation of a volatile situation. Alternatively, or additionally, the stream of video and/or audio content may be redirected from the dispatch center 120 to another electronic device. For example, an expert or specialist experienced in volatile situation management and/or crisis management may called in to assist. The expert or specialist would be able to view the redirected live streaming video and/or audio content on their electronic device, and interact with the law enforcement officer.

Alternatively, or additionally, the dispatch personnel may dispatch assistance to the law enforcement officer. Alternatively, or additionally, the personnel at the dispatch center 120 may generate information that is communicated to the gun camera 102, the holster system 104, and/or the monitoring badge 106.

The communicated stream of video and/or audio content acquired by the gun camera 102 (and/or the camera 114 of the monitoring badge 106) may be stored at the dispatch center 120 in a suitable memory medium. Alternatively, or additionally, the acquired stream of video and/or audio content may be communicated to a cloud server system 126 for storage in a suitable cloud architecture memory 128, as is known in the arts. In a preferred embodiment, a hosting client that manages the weapon use monitoring system 100 controls and manages the server system 126 and the memory 128 for reasons of security and confidentiality. Accordingly, the hosting client may control access to any stored video and/or audio content. Alternatively, or additionally, the acquired stream of video and/or audio content may be stored in a memory of the gun camera 102, the holster system 104, and/or the monitoring badge 106. Alternatively, or additionally, the acquired stream of video and/or audio content may be communicated to a smart phone 130 of the law enforcement officer for storage in a memory of the smart phone 130.

A significant advantage of embodiments of the weapon use monitoring system 100 over legacy law enforcement officer monitor systems is the integrated nature of the communication systems employed by the weapon use monitoring system 100. In the various embodiments, one or more of the gun camera 102, the holster system 104, and/or the monitoring badge 106 are in direct wireless communication with each other. Since the gun camera 102, the holster system 104, and/or the monitoring badge 106 will be in close proximity to each other, wireless communications between each other may use a low power wireless communication medium and system, such as a suitable near-field communication system. Accordingly, one or more of the gun camera 102, the holster system 104, and/or the monitoring badge 106 may have a reduced power supply capacity (battery).

In the various embodiments, one or more of the gun camera 102, the holster system 104, and/or the monitoring badge 106 may be communicatively coupled to a remote electronic device using any suitable wireless communication medium and system. For example, one or more of the gun camera 102, the holster system 104, and/or the monitoring badge 106 may be configured to wirelessly communicate using a cellular system telephony/data medium to the law enforcement officer's smart phone 130, or to another smart phone 130. The smart phone 130 may store the received video and/or audio content. Alternatively, or additionally, the smart phone 130 may relay the received video and/or audio content to the cloud server system 126 for storage. Alternatively, or additionally, the smart phone 130 may relay the video and/or audio content to the dispatch system 120.

In the various embodiments, one or more of the gun camera 102, the holster system 104, and/or the monitoring badge 106 may be communicatively coupled to a remote electronic device via a legacy WiFi system 132 that is in proximity to the weapon use monitoring system 100. Alternatively, or additionally, the weapon use monitoring system 100 may be communicatively coupled to a patrol vehicle WiFi 134 residing in the patrol vehicle 136 of the law enforcement officer and/or that is residing in another patrol vehicle 136. For example, one or more of the gun camera 102, the holster system 104, and/or the monitoring badge 106 may be configured to detect the presence of a WiFi hotspot 132, 134 and then establish connectivity to the WiFi hotspot 132, 134. Then, the acquired video and/or audio content may be wirelessly communicated to the law enforcement officer's smart phone 130, or to another smart phone 130, the cloud server system 126, and/or the dispatch system 120 via the connected WiFi hotspot 132, 134 as described herein.

In the various embodiments, one or more of the gun camera 102, the holster system 104, and/or the monitoring badge 106 may be communicatively coupled to a law enforcement officer radio 122 and/or the patrol vehicle radio 124 that is in proximity to the weapon use monitoring system 100. One skilled in the arts appreciates that such specialized radio systems may have secured channels that are not publicly accessible. A nonlimiting example of a radio communication system is the well-known push-to-talk communication system. The acquired video and/or audio content may be wirelessly communicated to the cloud server system 126, and/or the dispatch system 120 via the law enforcement officer radio 122 and/or the patrol vehicle radio 124. If equipped with a suitable memory medium, the video and/or audio content may be optionally stored in the law enforcement officer radio 122 and/or the patrol vehicle radio 124. Alternatively, or additionally, the received video and/or audio content may be relayed from the radio 122, 124 to the cloud server system 126 and/or the dispatch system 120 as described herein. In some embodiments, the video and/or audio content may be communicated to a computer residing in the patrol vehicle 136. Further, personnel at the dispatch center 120 may initiate two way verbal communications with the law enforcement officer using the weapon use monitoring system 100 and/or with other nearby law enforcement officers.

In a law enforcement environment, a significant unexpected advantage of embodiments of the weapon use monitoring system 100 is provided by the display 116 on the exterior surface of the monitoring badge 106. In some embodiments, when the weapon 108 is drawn from the holster 110 such that the weapon use monitoring system 100 is activated, information indicating that the weapon 108 has been drawn by the law enforcement officer may be presented on the display 116. Such information would indicate the drawn weapon situation to individuals in front of the law enforcement officer and/or to other law enforcement officers. For example, the display 116 may become illuminated with a bright, highly visible color and/or a textual (or iconic) message to indicate to the law enforcement officer, to other nearby law enforcement officers, and to other individuals that the weapon 108 has been drawn. Alternatively, or additionally, a short animated video clip informing a viewer that the weapon 108 has been drawn from the holster 110 may be presented in the display 116.

Alternatively, or additionally, a video clip or the like may be presented on the display 116. The presented video clip may be stored in a memory of one of the components of the weapon use monitoring system 100, and accessed and presented on the display 116 in response to the drawing of the weapon 108 from the holster 110. Presentation on the display may conclude in response to the weapon 108 being returned to the holster 110, either immediately or after some predefined delay threshold duration. Alternatively, or additionally, a selected video clip may be communicated from the dispatch center 120 to the weapon use monitoring system 100 in response to a selection by the personnel working at the dispatch center 120. In some situations, the textual information and/or video clip presented on the display 116 may be helpful in resolving a potentially volatile situation that is being encountered by the law enforcement officer.

Another unexpected advantage provided by embodiments of the weapon use monitoring system 100 is the concurrent communication of the acquired video and/or audio content to multiple electronic devices. For example, the video and/or audio content cam be concurrently communicated to the dispatch center for immediate analysis and storage, and also be communicated to the cloud server system 126 for storage. Here, the acquired video and/or audio content is stored in a secure, tamper proof manner to memorialize the event in which the weapon 108 was drawn from the holster 110.

Figure 2:
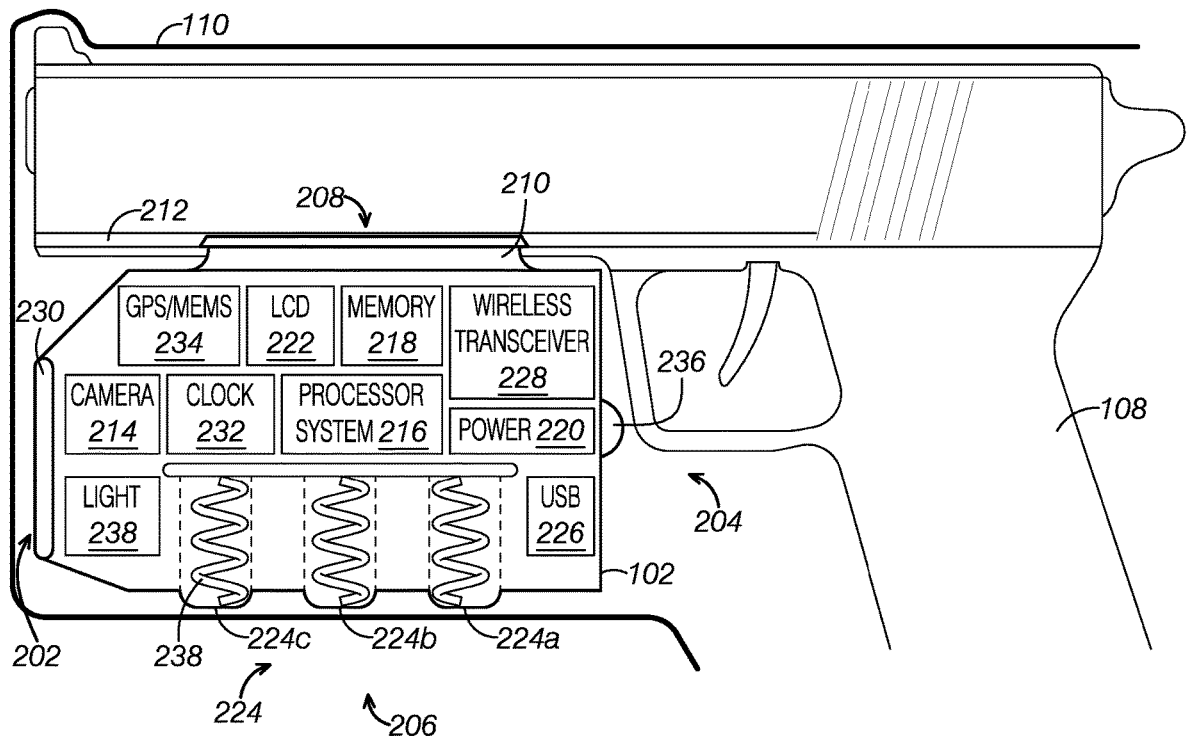
FIG. 2 is a cut away view and block diagram of selected components of the gun camera.
Figure 3:
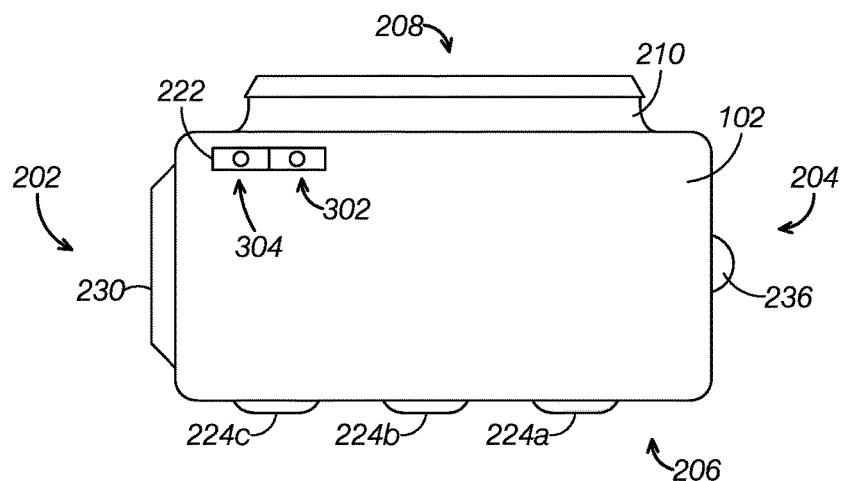
FIG. 3 is a side view of the gun camera.
Figure 4:
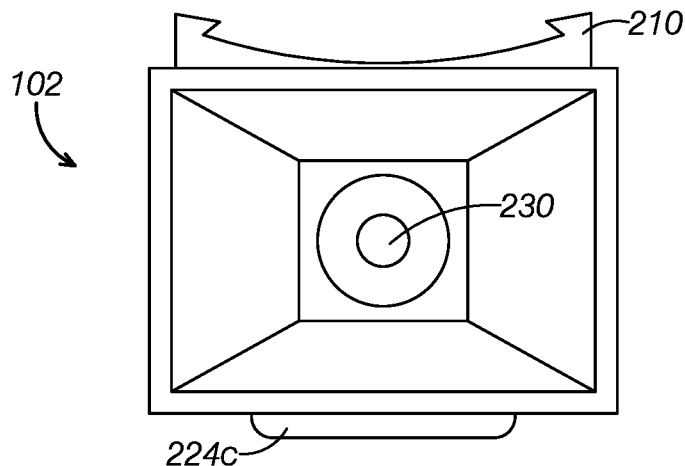
FIG. 4 is a view of the front surface of the gun camera.
Figure 5:
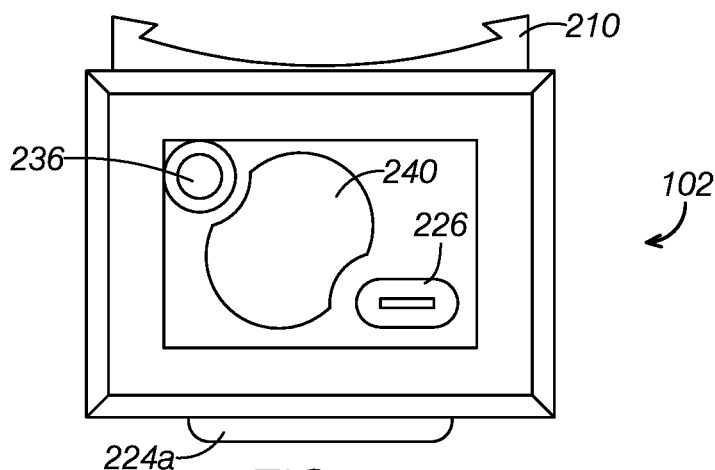
FIG. 5 is a view of the rear surface of the gun camera.
Figure 6:
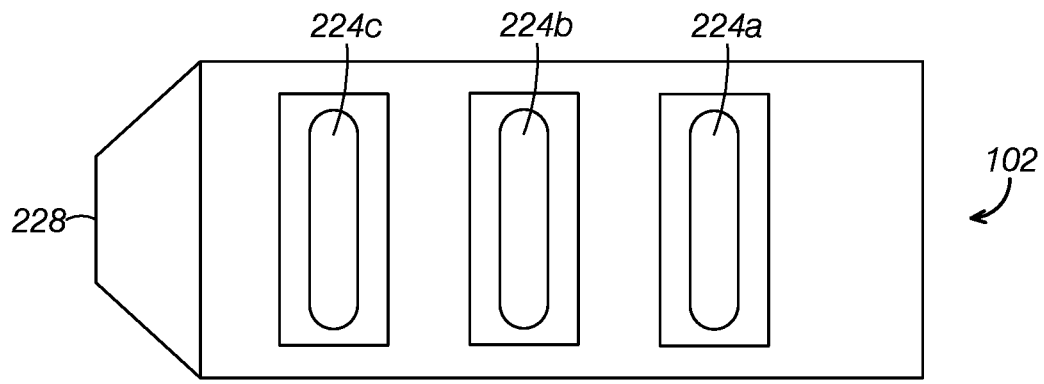
FIG. 6 is a view of the bottom surface of the gun camera.

FIG. 2 is a cut away view and block diagram of selected components of the gun camera 102. FIG. 3 is a side view of the gun camera 102. FIG. 4 is a view of the front surface 202 of the gun camera 102. FIG. 5 is a view of the rear surface 204 of the gun camera 102. FIG. 6 is a view of the bottom surface 206 of the gun camera 102.

The top surface 208 of the gun camera 102 includes a connection means 210 that is configured to couple the gun camera 102 to a corresponding connection means 212 below the barrel of the weapon 108. In a preferred embodiment, the connection means 201 and 212 are a track and rail system that slidably secures the top surface 208 of the gun camera 102 to the bottom of the barrel of the weapon 108. Preferably, a securing device, such as a locking screw, a bolt, or a clip (not shown) locks the gun camera 102 onto the weapon 108 so that the gun camera 102 cannot be inadvertently or intentionally removed from the weapon 108 while the law enforcement officer is in the field. Here, the securing device can be released to permit removal of the gun camera 102 from the weapon 108 using a specialized tool. For example, the gun camera 102 may be decoupled from the weapon 108 when the weapon 108 is not in use in the field, such as when the weapon 108 is being cleaned, inspected, and/or used in a non-working environment, such as a target range or the like. Alternatively, or additionally, an electronic lock may be used to secure the gun camera to the weapon 108, where a password protected code is required to release the electronic lock. In some embodiments, the gun camera 102 may be an integrated component of the weapon 104

The non-limiting exemplary gun camera 102 comprises an image capture device 214 (camera 214), a processor system 216, a memory 218, a power source 220, an optional liquid display (LCD) 222, a plurality of sensors 224a, 224b, 224c, an optional uniform serial bus port (USB) 226, a wireless transceiver 228, a lens 230, a clock 232, an optional global positioning system/micro-electromechanical system 234 (GPS/MEMs 234), an optional in-use indicator 236 and an optional light 238. The memory 218 comprises portions for storing logic to control operation of the gun camera 102 and for optionally storing acquired video and/or audio content. In some embodiments, the logic stored in the memory 218 may be integrated with other logic. In other embodiments, some or all of these memory and other data manipulation functions may be provided by using a remote server or other electronic devices suitably connected via the Internet or otherwise to a client device. Other gun cameras 102 may include some, or may omit some, of the above-described components. Further, additional components not described herein may be included in alternative embodiments.

In a law enforcement environment, the gun camera 102, the holster system 104, and the monitoring badge 106 are directly communicatively coupled to each other via wireless communication signals 112. The gun camera 102, the holster system 104, and/or the monitoring badge 106 include at least one wireless transceiver 228. In a preferred embodiment, the wireless transceiver 228 in the gun camera 102 is configured to wirelessly communicate (via the wireless signals 112) with corresponding wireless transceivers 228 in the holster system 104 and/or the monitoring badge 106. Alternatively, or additionally, the wireless transceiver 228 may also communicate with other remote electronic devices as disclosed herein. Any suitable wireless communication system using the transceivers 228 now known or later developed may be used by the various embodiments. In such embodiments, the wireless communication system may be a low power communication system, such as a near-field communication system.

Some embodiments may include multiple wireless transceivers 228. Each wireless transceiver 228 may be configured to communicate with other wireless communication formats that are incompatible with the communication format of the above described wireless transceivers 228 that facilitate communication between the gun camera 102, the holster system 104, and the monitoring badge 106. For example, an additional transceiver 228 may be included that is configured to communicate over a wireless telephony system, such as a 4G or 5G wireless network. Alternatively, or additionally, a wireless transceiver 228 may be configured to communicate over a push-to-talk system that is being used by the radios 124, 122.

In a private citizen use environment, the monitoring badge 106 is preferably omitted. In some embodiments, the wireless transceiver 228 may be configured to communicate directly to a remote electronic device. If the weapon user has subscribed to a security service, the video and/or audio content may be communicated to the security service dispatch center 102 and/or a 911 emergency dispatch center 102. In some embodiments, the acquired video and/or audio content may be communicated to the weapon user's electronic device, such as their smart phone, their personal computer, or other device that is configured with a memory that stores the received video and/or audio content.

Any suitable image capture device 214 now known or later developed may be used by the various embodiments. Preferably, the image capture device 214 is a high resolution video camera with a suitable field of depth so as to acquire high resolution video and/or still images that are useful for later analysis. Some embodiments may include multiple image capture devices 214. For example, a thermal imaging camera, an infrared camera, and/or a night vision camera may be included in some embodiments.

The optional liquid display (LCD) 222 is disposed on an exterior surface of the gun camera 102. When the image capture device 214 detects a discharge of the weapon 108, identifiable by a large and brilliant bright flash detectable on a video or still image acquired by the camera 214, the processor 216 generates in indication signal that is communicated to and is presented by the LCD 222. Here, some characteristic of acquired image data of the video content is monitored. A large brilliant muzzle flash is characterized by a high luminosity or intensity value in the video still image captured by the camera 214. Alternatively, or additionally, color in an image might be analyzed in some embodiments, where a brilliant white color would be associated with the muzzle flash. If the characteristic value in a monitored image exceeds some threshold, then discharge of the weapon 108 can be determined by the processor system 216. If an infrared camera and/or a thermal imaging camera are included in the gun camera 102, these cameras may detect the muzzle flash.

In a preferred embodiment, the indication presented on the LCD 222 is a numerical value that indicates the number of times that the weapon 108 has been discharged. One skilled in the art appreciates that during a highly volatile situation where the weapon 108 is discharged one or more times, and/or where other weapons are discharged, the law enforcement officer, private citizen, or military personnel is likely to be in an extremely excited and/or agitated state. Here, the law enforcement officer, private citizen, or military personnel is not likely paying attention to how many times their weapon 108 is discharged. Using embodiments of the weapon use monitoring system 100, after conclusion of the volatile situation, the law enforcement officer and/or other law enforcement personnel, the private citizen, or the military personnel may view the LCD 222 to ascertain the number of times that the weapon 108 was discharged.

In a preferred embodiment, a first portion of the LCD 222 may indicate a first numerical value 302 (FIG. 3) corresponding to the total number of discharges of the weapon 108 since its last reset. Another portion of the LCD 222 may indicate a second numerical value 304 corresponding to the incremental number of discharges of the weapon 108 after it was drawn from the holster 110 and/or during a predefined duration. In other embodiments, any suitable textual and/or numerical information may be indicated by the LCD 222.

Some embodiments of the LCD 222 will include a reset button that resets the values shown on the LCD 222 to zero. Alternatively, or additionally, the values may be reset by others, such as the personnel working in the dispatch center 120.

In a law enforcement environment, an unexpected benefit of displaying the number of discharges of the weapon 108 is to improve the accuracy and reliability of incident reports later prepared by the law enforcement officer. In some instances, the law enforcement officer may have difficulties recalling the number of times, and/or when, they discharged their weapon 108. Here, the law enforcement officer can reliably recollect the number of discharges of their weapon 108 during a particular incident by viewing the information presented on the LCD 222.

Further, the clock 232 provides time stamp information that is integrated into the video and/or audio content as the data that is being acquired by the gun camera 102 and/or the camera 114 of the monitoring badge 106. Here, when multiple weapons have been discharged, the acquired video and/or audio content can be analyzed to identify which weapons were discharged and when the weapons were discharged. The captured and time stamped image of the muzzle flash of the weapon 108 can be used to precisely identify when the weapon 108 was discharged by the law enforcement officer. Legacy body cameras and/or in-car camera systems are entirely unsatisfactory for this purpose.

The GPS/MEMs 234 is an optional module that includes a global positioning system (GPS) and/or a micro-electro-mechanical system (MEMs). The GPS 234 and the MEMS 234 may be fabricated together, or may reside as separate modules depending upon the embodiment. The GPS 234 acquires location information from a plurality of satellites. The processor system 216, or a processor residing in the GPS 234, determines a current location of the gun camera 102. The MEMs 234 acquires change in orientation information from a plurality of accelerometers fabricated using MEMs 234 technology. The processor system 216, based on a predefined orientation of the gun camera 102 while in the holster 110 that is being worn by the law enforcement officer, determines an initial orientation of the gun camera 102. The location information and the changing orientation information is time stamped by the cock 232, and is included with the communicated video and/or audio content. For example, a determination may be made when the weapon 108 is pointed downward and/or to the side in a non-threatening manner, and determine when the weapon 108 is raised into a firing orientation. This orientation information may be included with the communicated and stored video and/or audio content. In some embodiments, an artificial intelligence (AI) system may be used to learn about orientation of the weapon 108 and its associated use. For example, embodiments may track and/or sense hand movements that may be associated with particular hand signals and/or other body language. In other embodiments, the GPS/MEMs 234 may be alternatively or additionally included in the holster system 104 and/or the monitoring badge 106, in whole or in part.

An unexpected advantage provided by the gun camera 102 is that because the orientation of the gun camera 102 is aligned with the orientation of the barrel of the weapon 108, images that are acquired before detection of the discharge may be used to identify the intended target and/or the actual target. Further, image data acquired immediately after a discharge of the weapon 108 may be used to identify which particular object was impacted by the discharged projectile (bullet), and/or to ascertain the effect of the impact of the projectile upon the object. Legacy body cameras and/or in-car camera systems are entirely unsatisfactory for this purpose.

More particularly, the information acquired by the GPS/MEMS 234 located in the gun camera 102 is that the determined location and orientation of the weapon 108 (which is the same as the location and orientation of the gun camera 102) can be determined to identify a trajectory of the projectile when the weapon 108 is discharged. This information may be included with the communicated and stored video and/or audio content. Further, based on image analysis techniques that can identify an object that is discernable in an image, and based upon the known velocity of the projectile, the location of object that the projectile impacts can be computed. Here, depth analysis of the image information can approximate a distance between the weapon 108 and the target object. Based on trajectory and velocity of the projectile, a time of impact of the projectile can be approximated. A still image having a time corresponding to the estimated time of impact can be identified for analysis, and/or a plurality of images about the estimated time of impact can be accessed for analysis. Analysis of the image(s) can be used to identify the targeted object. If the target object was missed, further analysis can be used to determine precisely where the projectile went.

In the illustrated nonlimiting example embodiment of the gun camera 102, three sensors 224a, 224b, 224c are disposed along the length of the bottom surface 206 of the gun camera 102. Any number of sensors 224 may be used in the various embodiments. The sensors provide information to the processor system 216 for determination of whether the weapon 108 is currently secured within the holster 110 or has been drawn from the holster 110.

In the example embodiment, the sensors 224a, 224b, 224c are mechanical sensors that detect when the bottom of the sensors 224a, 224b, 224c have been depressed by the material of the holster 110. In an example embodiment, the sensors 224a, 224b, 224c are physical contact sensors spread apart across the bottom surface 206 of the gun camera 102. When the gun camera 102 is secured within the holster 110, the sensors 224a, 224b, 224c are depressed, thereby indicating that the weapon 108 is holstered. A spring 238 in each of the sensors 224a, 224b, 224c exerts a force on the bottom of each of the sensors 224a, 224b, 224c so as to keep the bottom of the sensors 224a, 224b, 224c in contact with or in proximity to the interior surface of the holster 110. When the weapon 108 is drawn from the holster 110, the compressed springs 238 extend the bottom of the sensors 224a, 224b, 224c outwardly. When in the extended state, the sensors 224a, 224b, 224c provide information to the processor system 216 so that the processor system 216 determines that the weapon 108 is no longer secured within the holster 110.

Any suitable sensor 224 now known or later developed may be used in alternative embodiments. For example, an optical sensor 224 may be used. Alternatively, or additionally, sensors 224 disposed in the holster system 104 may be used to detect the drawing of the weapon 108 from the holster 110. Alternatively, or additionally, one or more of the sensors 224 may be disposed on other surfaces of the gun camera 102 and/or within the holster 110.

An unexpected benefit provided by the one or more sensors 224 is that when the removal of the weapon 108 and its gun camera 102 from the holster 110 is detected, the gun camera 102 may be actuated to acquire video and/or audio content. When the weapon 108 is secured within the holster 110, the gun camera 102 is deactivated (and does not acquire video and/or audio content). Accordingly, storage capacity and/or power requirements can be minimized, particularly with respect to legacy body cameras and/or in-car camera systems.

Another unexpected advantage of using a plurality of sensors 224 spaced along the bottom surface 206 of the gun camera 102, and/or on other surfaces of the gun camera 102, is that the likelihood of the weapon user unintentionally, or intentionally, deactivating the gun camera 102 while the weapon 108 is drawn is reduced. Here, in the illustrated example embodiment, the law enforcement officer would have to depress all three of the sensors 224a, 224b, 224c simultaneously to emulate the weapon 108 being secured within the holster 110. Even if one or two of the sensors 224a, 224b, 224c are depressed, the gun camera 102 still remains activated because at least one sensor has not been depressed. Alternatively, or additionally, a sensor 224 (not shown) located in the holster system 104 may provide additional information to the processor 216 to confirm that the weapon 108 has been drawn from the holster 110.

Another unexpected advantage provided by embodiments of the weapon use monitoring system 100 is that an inadvertent or intentional mix-up or misplacement of the weapon 108 is not possible. Here, optional identification information in the gun camera 102 identifies that particular gun camera 102. Similarly, optional identification information in the holster system 104 identifies that particular holster system 104. When the gun camera 102 and the holster system 104 are paired together (by associating their respective identification information with each other), the weapon use monitoring system 100 may determine whether the weapon 108 has been holstered in its paired holster 110. For example, during a volatile situation, a law enforcement officer may inadvertently lose their weapon 108 and/or inadvertently exchange their weapon 108 with the weapon of another law enforcement officer. If the misplaced weapon 108 is holstered in a different holster, the gun camera 102 may remain actuated. Here, acquired video and/or audio content may be used to ascertain the location of the misplaced weapon 108. Alternatively, or additionally, location information acquired by the GPS 234 may be communicated to the dispatch center and/or to the law enforcement officer's smart phone 130 to facilitate location of the weapon 108.

The optional uniform serial bus port 226 (USB 226) may be configured to couple to a USB cord and a power source so as to provide recharging power to the power source 220. A battery access port 240 may be provided to access and/or replace batteries used by the gun camera 102. Preferably, the power 220 is a rechargeable battery or the like.

Alternatively, or additionally, some embodiments of the gun camera 102 include a battery contact surface (not shown) that comes into contact with a corresponding power contact surface in the holster system 104. Here, the holster system 104 may be coupled to an external power source. Received power may be used to charge a battery in the holster system and/or the power source 220 when the gun camera 102 is secured within the holster 110. Alternatively, or additionally, the power source 220 may receive power from the battery in the holster system 104 in instances where the holster battery is configured to have sufficient capacity to ensure that the power source 220 remains fully charged when the law enforcement officer is out in the field.

Some embodiments include an optional in-use indicator 236 disposed on a suitable surface of the gun camera 102. The indicator 236 may be a small light or the like that illuminates if the weapon use monitoring system 100 is actively acquiring video and/or audio content.

Some embodiments include an optional on/off switch 238. When the weapon use monitoring system 100 has not otherwise been activated when the law enforcement officer is on duty and is out in the field, the switch 238 may turn on and turn off the weapon use monitoring system 100. For example, a user may wish to turn on the weapon use monitoring system 100 to test its operational fitness. Here, the switch 238 can be used to activate the gun camera 102 for testing or inspection. However, in a law enforcement or military environment, it the law enforcement officer or military personnel is on duty and the weapon use monitoring system 100 has been activated, such as by the personnel in the dispatch center 120, the switch 238 is disabled and cannot be used to turn off the weapon use monitoring system 100.

To enhance imaging quality, some embodiments may include the lens 230. The lens 230 preconditions light that is detectable by the camera 214. For example, a range finding system, or the like, may be employed in some embodiments to ensure that the camera 214 is always in focus, which may be adjustable by an automatic focusing system.

The nonlimiting example gun camera 102 is disclosed as being secured to the lower part of the barrel of the weapon 108. In other embodiment, the gun camera 102 may be secured to other locations on the weapon. Any suitable weapon, or component thereof, may be configured to secure an embodiment of the gun camera 102.

In some embodiments, an optional light 238 may be included as a component of the gun camera 102. When the sensors 224 detect that the weapon has been removed from the holster 110, a signal may be communicated to the processor system 216 to turn on the light 238. The light 238 may provide illumination for lighting the field in the area proximate to the law enforcement officer. The light 238 may include an ambient light level sensor so that the light 238 only turns on at night or in areas of low light (where the ambient light level is below an ambient light level threshold).

Figure 7:
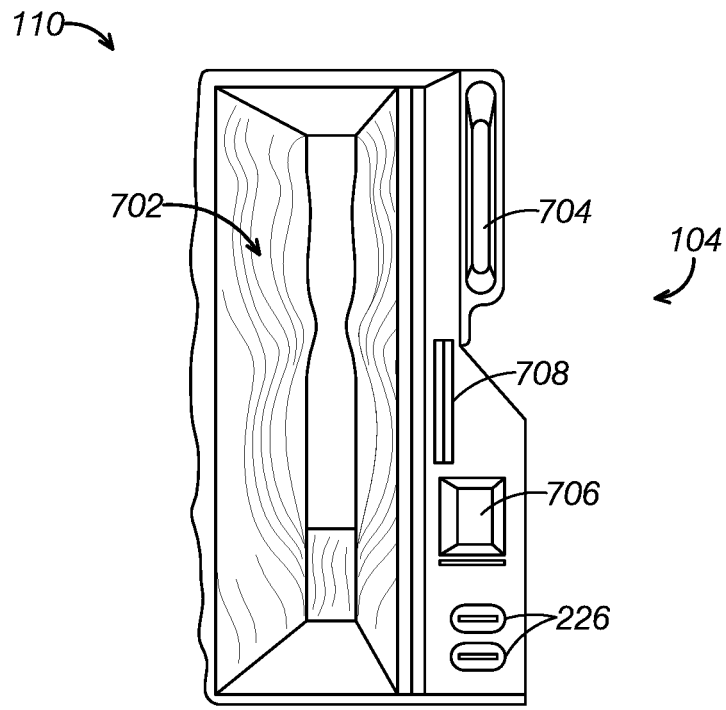
FIG. 7 is a perspective view of the opening and interior of the holster.

FIG. 7 is a perspective view of the opening and interior 702 of the holster 110. Disposed on the surface of the holster system 104 are one or more USB ports 226. In some applications, one of the USB ports 226 may be used to charge power supplies of the holster system 104 and/or the gun camera 102, while the other USB port 226 may be used to download stored video and/or audio content.

A suitable securing means 704, such as a belt hook, belt clip or the like, is used to secure the holster 110 to the weapon user. The interior of the holster 110 is configured to receive the gun camera 102 and the weapon 108, and is further configured to hold the holster system 104.

A battery access port 706 may be provided to access and/or replace batteries used by the holster system 104.

One or more ports 708 for receiving various memory media, such as memory cards or modules, that are coupled to the exterior surface of the holster system 104. Accordingly, legacy SD memory cards and/or micro SD cards may be used to store acquired video and/or audio content. After use, these memory cards may be retrieved and then used to access the acquired video and/or audio content using a personal computer or other suitable memory reading electronic device. Alternatively, or additionally, the memory cards may be used to buffer acquired image and/or audio content while the data is being processed for communication to a remote electronic device.

Figure 8:
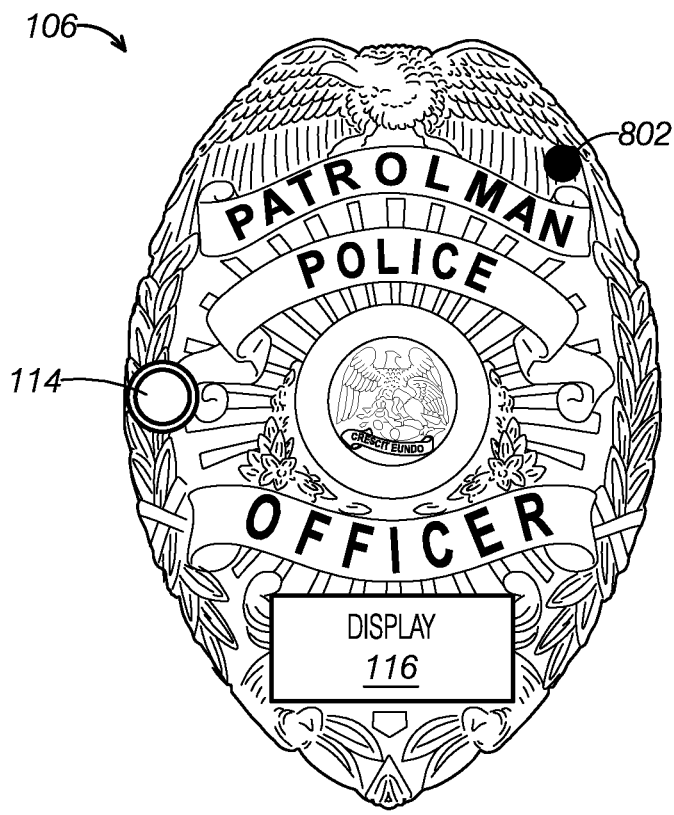
FIG. 8 is a frontal view of the monitoring badge.

FIG. 8 is a frontal view of the monitoring badge 106. Some embodiments may include a microphone 802 that acquires a stream of audio content. An unexpected advantage of acquiring a stream of audio content using the microphone 802 and an optional microphone of the gun camera 102 is that a comparison of the audio streams may be used for verification purposes and/or redundancy.

The display area of the display 116 may be designed to be any suitable size. In some embodiments, the entirety of, or substantially the entirety of, the exterior surface of the monitoring badge 106 may be the display 116. For example, the monitoring badge 106 may resemble a relatively small light weight smart phone. Here, the displayed image may be configured to present any information of interest. For example, the display may be modified to indicate the name and user ID of the law enforcement officer who is using the weapon use monitoring system 100. Alternatively, or additionally, the display may indicate the name of or identity of the law enforcement agency that the law enforcement officer is working for. In an example embodiment, the size of the display 116 may be approximately two inches by four inches and is located in a lower portion of the monitoring badge 106.

An unexpected advantage of a larger area display 116 is that an embodiment of the weapon use monitoring system 100 can be checked out to the law enforcement officer or military personnel before they leave on field duty. The monitoring badge 106 may then present information associated with that particular law enforcement officer, such as their name, their department, and/or their ID number. When the law enforcement officer or military personnel returns from the field, the weapon use monitoring system 100 can be checked back in at the dispatch center 120 or another suitable location, and then be reassigned to another law enforcement officer or military personnel. Further, a plurality of weapon use monitoring systems 100 may be checked out to a plurality of different law enforcement officers from different law enforcement agencies during a joint field operation of the different law enforcement agencies. During the field operation, embodiments of the weapon use monitoring system 100 can acquire video and/or audio content from each of the different law enforcement officers to memorialize the field operation.

Figure 9:
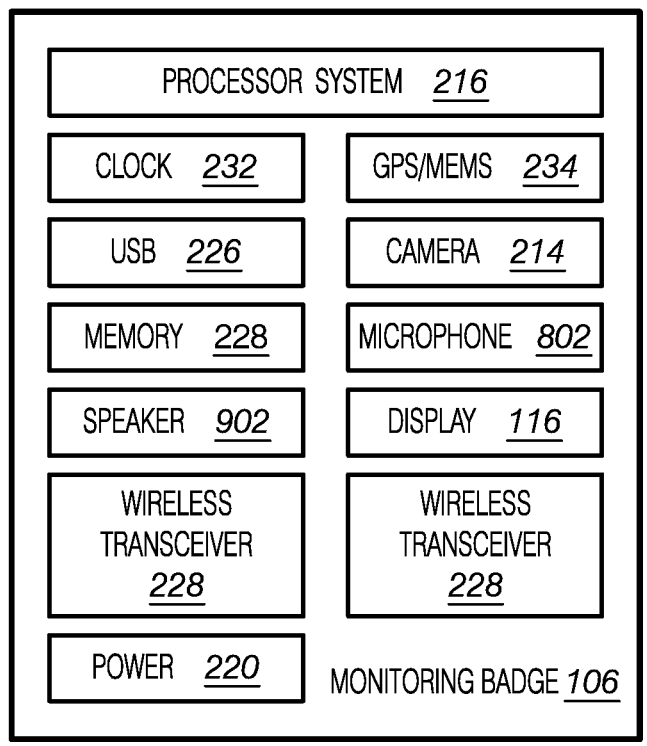
FIG. 9 is a block diagram illustrating selected components of the monitoring badge.
Figure 10:
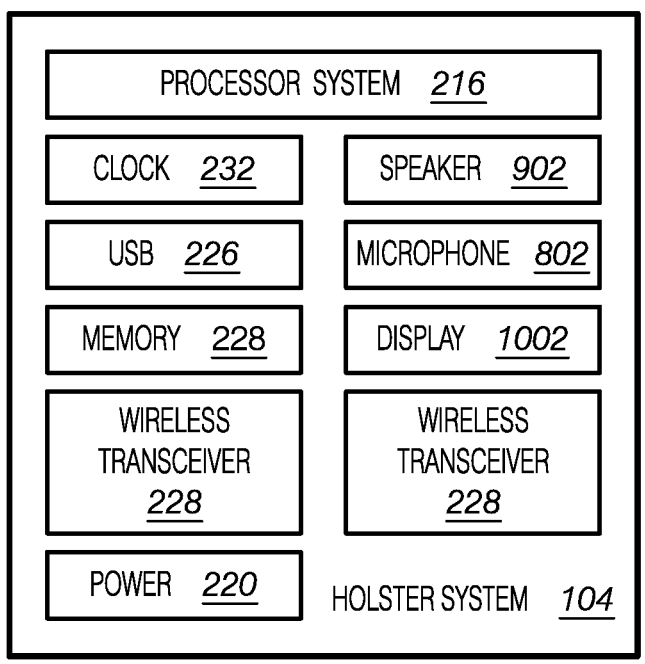
FIG. 10 is a block diagram illustrating selected components of the monitoring badge.

FIG. 9 is a block diagram illustrating selected components of the monitoring badge 106. FIG. 10 is a block diagram illustrating selected components of the holster system 104. Like components previously described herein are identified with like reference numerals, and have the same functionality, or substantially the same functionality, as described herein. For brevity, these components are not described again. Other monitoring badges 106 and/or holster systems 104 may include some, or may omit some, of the illustrated components. Further, additional components not described herein may be included in alternative embodiments.

In some embodiments, the monitoring badge 106 and/or the holster 104 may include an optional speaker 902. The processor system 216 of the monitoring badge 106 may access and/or may receive audible information that is presented as audible sounds from the speaker 902. For example, but not limited to, an audible warning message may be issued when the weapon 108 is initially drawn from the holster 110 and/or while the weapon 108 remains drawn. Another optional audible message may be issued from the speaker 902 when the weapon 108 is returned to the holster 110. Alternatively, or additionally, audible communications from personnel at the dispatch center 120 may be communicated to the monitoring badge 106, and then may be issued from the speaker 902. Here, the monitoring badge 106 may replace the legacy officer radio 122 and/or the smart phone 130.

In some embodiments, the holster system 104 may include an optional display 1002 of any suitable size that may present any suitable information of interest. For example, but not limited to, the display 1002 may present battery charge level information.

Figure 11:
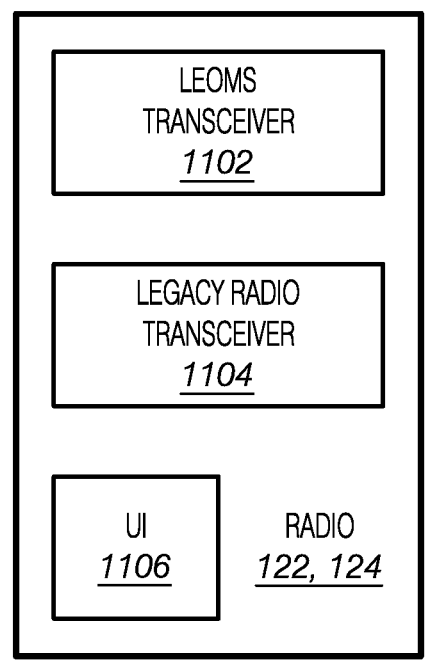
FIG. 11 is a block diagram illustrating selected components of the officer radio and/or the patrol vehicle radio.

FIG. 11 is a block diagram illustrating selected components of the officer radio 122 and/or the patrol vehicle radio 124. In some embodiments, the radio 122, 124 may be equipped with a special purpose law enforcement officer monitoring system (LEOMS) transceiver 1102 in addition to the legacy radio transceiver 1104. In embodiments where the transceiver(s) 228 of the gun camera 102, the holster system 104, and/or the monitoring badge 106 are not capable of communicating with the legacy radio transceiver 1104, the LEOMS transceiver 1102 is able to communicate with the transceiver(s) 228 in one or more of the gun camera 102, the holster system 104, and the monitoring badge 106. The video and/or audio content communicated from the gun camera 102, the holster system 104, and/or the monitoring badge 106 may be received by the LEOMS transceiver 1102, and then be relayed to the legacy radio transceiver 1104 for communication to other remote electronic devices. In some embodiments, a suitable user interface (UI) 1106 may be provided to allow the user of the radio 122, 124 to manage communications between the LEOMS transceiver 1102 and the legacy radio transceiver 1104.

Depending upon the embodiment, the gun camera 102, the holster system 104, and/or the monitoring badge 106 may each be concurrently acquiring video data, audio content, and/or other data. Preferably, a selected one of the gun camera 102, the holster system 104, and/or the monitoring badge 106 receives the acquired data for the other components. The received data is then aggregated together and time stamped into one cohesive time stamped set of data by the selected one of the gun camera 102, the holster system 104, and/or the monitoring badge 106. The aggregated data may then be communicated to a storage medium or other electronic device as disclosed herein. An unexpected advantage of aggregating acquired data is that the gun camera 102, the holster system 104, and/or the monitoring badge 106 that by aggregating and communicating the aggregated data, one or more of the gun camera 102, the holster system 104, and/or the monitoring badge 106 may have fewer components and/or different components, and may use components that consume less power.

Any suitable processor system 216 now known or later developed, may be used in the various embodiments. Preferably, the processor systems 216 are specially fabricated and custom designed micro-processor systems that are incorporated into the various embodiments of the weapon use monitoring system 100.

It should be emphasized that the above-described embodiments of the weapon use monitoring system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at leas the following is claimed:

1. A gun camera secured to a weapon, wherein the gun camera and the weapon are configured to be secured within a holster when the weapon is not in use, comprising:
   a processor system;
   a camera communicatively coupled to the processor system;
   a wireless transceiver communicatively coupled to the processor system; and
   at least one sensor configured to detect an interior surface of the holster,
   wherein the at least one sensor communicates a signal to the processor that indicates that the gun camera and the weapon are not secured within the holster in response to no longer detecting the interior surface of the holster,
   wherein the processor system activates the camera to acquire video content in response to receiving the signal from the at least one sensor that indicates that the weapon has been drawn from the holster,
   wherein the signal communicated from the at least one sensor is a first signal,
   wherein, after the camera has been activated to acquire the video content in response to the first signal, the at least one sensor senses the interior surface of the holster in response to a user securing the gun camera and the weapon within the holster,
   wherein the sensor communicates a second signal to the processor that indicates that the gun camera and the weapon are secured within the holster in response to detecting the interior surface of the holster, and
   wherein the processor system deactivates the camera to end acquisition of the video content in response to receiving the second signal from the at least one detector.

2. The gun camera of claim 1, wherein the wireless transceiver communicates the acquired video content to a remote electronic device, and wherein the remote electronic device stores the received video content.

3. The gun camera of claim 2,
   wherein the video content is communicated from the gun camera over a near-field communication system to a holster system, and
   wherein the video content is stored into a memory medium that is coupled to the holster system.

4. The gun camera of claim 2,
   wherein the video content is communicated from the gun camera to a radio, and
   wherein the video content is communicated from the radio to the remote electronic device.

5. The gun camera of claim 2,
   wherein the video content is communicated from the gun camera to the Internet, and
   wherein the video content is communicated from the Internet to a cloud server with a memory that stores the received video content.

6. The gun camera of claim 2,
   wherein the video content is communicated from the gun camera to a WiFi hot spot, and
   wherein the video content is communicated from the WiFi hot spot to a cloud server with a memory that stores the received video content.

7. The gun camera of claim 2,
   wherein the remote electronic device is located at a dispatch center,
   wherein the video content is communicated from the gun camera to the remote electronic device, and
   wherein personnel at the dispatch center view the acquired video content.

8. The gun camera of claim 1,
   wherein the second signal is communicated from the at least one sensor after a predefined duration, and
   wherein the camera continues to acquire video content during the predefined duration.

9. A gun camera secured to a weapon, wherein the gun camera and the weapon are configured to be secured within a holster when the weapon is not in use, comprising:
   a processor system;
   a camera communicatively coupled to the processor system;
   a wireless transceiver communicatively coupled to the processor system;
   at least one sensor configured to detect an interior surface of the holster; and
   a display disposed on a surface of the gun camera and communicatively coupled to the processor system,
   wherein the at least one sensor communicates a signal to the processor that indicates that the gun camera and the weapon are not secured within the holster in response to no longer detecting the interior surface of the holster,
   wherein the processor system activates the camera to acquire video content in response to receiving the signal from the at least one sensor that indicates that the weapon has been drawn from the holster,
   wherein the video content is analyzed by the processor system to identify a muzzle flash that indicates that the weapon has been discharged,
   wherein the processor system communicates a value to the display for presentation to a user of the weapon, and
   wherein the value indicates a number of times that the weapon has been discharged.

10. A gun camera secured to a weapon, wherein the gun camera and the weapon are configured to be secured within a holster when the weapon is not in use, comprising:
    a processor system;
    a camera communicatively coupled to the processor system;
    a wireless transceiver communicatively coupled to the processor system; and
    at least one sensor configured to detect an interior surface of the holster,
    a plurality of sensors disposed along a surface of the gun camera,
    wherein the at least one sensor communicates a signal to the processor that indicates that the gun camera and the weapon are not secured within the holster in response to no longer detecting the interior surface of the holster,
    wherein the processor system activates the camera to acquire video content in response to receiving the signal from the at least one sensor that indicates that the weapon has been drawn from the holster,
    wherein the at least one sensor is a member of the plurality of sensors, and
    wherein all of the plurality of sensors must concurrently no longer be detecting the interior surface of the holster before the sensor communicates the signal to the processor that indicates that the gun camera and the weapon are not secured within the holster.

11. The gun camera of claim 10,
    wherein the signal communicated from the at least one sensor is a first signal, wherein, after the camera has been activated to acquire the video content in response to the first signal, all of the plurality of sensors concurrently senses the interior surface of the holster in response to a user securing the gun camera and the weapon within the holster, wherein the sensor communicates a second signal to the processor that indicates that the gun camera and the weapon are secured within the holster in response to the plurality of sensors concurrently detecting the interior surface of the holster, and wherein the processor system deactivates the camera to end acquisition of the video content in response to receiving the second signal.

12. The gun camera of claim 1, wherein the gun camera is a member of a fire arm monitoring system, wherein the video content acquired by the gun camera is first video content, the system comprising:
a monitoring badge, comprising:
a monitoring badge camera; and
a monitoring badge transceiver that is wirelessly communicatively coupled to the wireless transceiver of the gun camera via a near-field communication system,
wherein the monitoring badge camera acquires second video content in response to receiving an activation signal from the gun camera when the gun camera is actuated and is acquiring the first video content, and
wherein the second video content acquired by the monitoring badge camera is communicated to the remote electronic device along with the first video content.

13. The monitoring badge of claim 12, wherein the monitoring badge camera continuously acquires the second video content while a user wearing the badge is in the field, and wherein the acquired second video content is communicated to the remote device for storage.

14. The gun camera of claim 12,
wherein at least one of the gun camera and the monitoring badge receives information generated by personnel at a dispatch center.

15. The monitoring badge of claim 12, further comprising:
a display,
wherein information is presented on the display indicates that the gun camera and the weapon are not secured within the holster.

16. The gun camera of claim 12, wherein the wireless transceiver in the gun camera is a first wireless transceiver that is communicatively coupled to the monitoring badge transceiver, the gun camera further comprising:
a second wireless transceiver that is wirelessly communicatively coupled to a communication network,
wherein the second wireless transceiver communicates the acquired first video content and the second video content to the remote electronic device for storage via the network.

17. The gun camera of claim 1, wherein the gun camera is a member of a fire arm monitoring system, the system comprising:
a holster system, comprising:
a port for a memory device; and
a holster system transceiver that is wirelessly communicatively coupled to the wireless transceiver of the gun camera via a near-field communication system;
wherein the holster system receives the video content acquired by the gun camera, and
wherein the holster system stores the received video content into the memory device that is coupled to the port of the holster system.

18. The holster system of claim 17, wherein the holster system transceiver is a first holster transceiver, and further comprising:
a second holster transceiver that is wirelessly communicatively coupled to a communication network,
wherein the second holster transceiver communicates the acquired video content to the remote electronic device for storage via the network.

19. A gun camera secured to a weapon, wherein the gun camera and the weapon are configured to be secured within a holster when the weapon is not in use, comprising:
a processor system;
a camera communicatively coupled to the processor system;
a wireless transceiver communicatively coupled to the processor system; and
at least one sensor configured to detect an interior surface of the holster,
wherein the at least on sensor communicates a signal to the processor that indicates that the gun camera and the weapon are not secured within the holster in response to no longer detecting the interior surface of the holster,
wherein the processor system activates the camera to acquire video content in response to receiving the signal from the at least one sensor that indicates that the weapon has been drawn from the holster,
wherein the gun camera is activated by a third party such that the gun camera cannot be deactivated by a user of the weapon,
wherein when the gun camera is activated, the camera acquires the video content in response to receiving the signal from the at least one sensor that indicates that the weapon has been drawn from the holster,
wherein the gun camera is deactivated only by the third party, and
wherein when the gun camera is deactivated, the camera does not acquire the video content in response to receiving the signal from the at least one sensor that indicates that the weapon has been drawn from the holster.

* * * * *